(12) United States Patent
Nowell (10) Patent No.: US 6,735,154 B2
(45) Date of Patent: May 11, 2004

(54) DEVICE AND METHOD FOR DETECTING CARTRIDGE READINESS TO LOAD IN A DATA STORAGE SYSTEM

(75) Inventor: Shane G. Nowell, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 260 days.

(21) Appl. No.: 09/946,071

(22) Filed: Sep. 4, 2001

(65) Prior Publication Data

US 2002/0101794 A1 Aug. 1, 2002

Related U.S. Application Data

(60) Provisional application No. 60/265,830, filed on Jan. 31, 2001.

(51) Int. Cl.[7] .............................................. G11B 11/00
(52) U.S. Cl. ..................................................... 369/30.36
(58) Field of Search ...................................... 369/30.36

(56) References Cited

U.S. PATENT DOCUMENTS

| | | | |
|---|---|---|---|
| 4,456,935 A | 6/1984 | Janosi | 360/97 |
| 4,627,039 A | 12/1986 | Meyer | 369/44 |
| 4,750,065 A | 6/1988 | Masaki et al. | 360/99 |
| 4,866,693 A | 9/1989 | Odawara et al. | 369/75.2 |
| 5,182,742 A | 1/1993 | Ohmori et al. | 369/116 |
| 5,202,861 A | 4/1993 | Yoshida | 369/13 |
| 5,485,329 A | 1/1996 | Lee | 360/99.06 |
| 5,485,330 A | 1/1996 | Hirose et al. | 360/99.06 |
| 5,703,857 A | 12/1997 | Davis et al. | 369/77.2 |
| 5,724,331 A | 3/1998 | Davis et al. | 369/77.2 |
| 5,748,577 A | 5/1998 | Sakiyama | |
| 5,768,241 A * | 6/1998 | Kanazawa et al. | 369/77.2 |
| 5,781,364 A | 7/1998 | Hashimoto et al. | 360/78.05 |
| 5,920,442 A | 7/1999 | Kasuga et al. | |
| 5,959,956 A | 9/1999 | Takishima | 369/75.2 |
| 6,078,563 A | 6/2000 | Goto et al. | 369/291 |
| 6,118,618 A * | 9/2000 | Kumakura | 360/99.02 |
| 6,182,899 B1 | 2/2001 | Muller et al. | |
| 6,262,959 B1 | 7/2001 | Hashimoto | 369/77.2 |
| 6,272,093 B1 | 8/2001 | Kurozuka et al. | 369/77.2 |
| 6,314,076 B1 * | 11/2001 | Arai et al. | 369/244 |
| 6,396,794 B1 | 5/2002 | Tsugami et al. | |
| 6,404,720 B1 | 6/2002 | Inoue | |
| 6,445,532 B1 | 9/2002 | Kappel | 360/92 |
| 6,469,865 B1 | 10/2002 | Maruyama | 360/99.06 |
| 6,512,731 B1 * | 1/2003 | Seo et al. | 369/77.2 |
| 6,538,971 B2 * | 3/2003 | Seo et al. | 369/77.2 |

* cited by examiner

Primary Examiner—A. J. Heinz
Assistant Examiner—Mark Blouin
(74) Attorney, Agent, or Firm—MacPherson Kwok Chen & Heid LLP (57) ABSTRACT

Disclosed is a data storage system having a base, a motor mounted to the base, and a device for detecting the presence of a data cartridge in the data storage system. The device is operatively coupled to the motor and generates a signal when the device detects the presence of the data cartridge in the data storage system. The motor activates in response to generation of the signal. The motor, when activated, moves the data cartridge within the data storage system between operational and non-operational positions. In one embodiment, the device includes a light sensor and a light generator. The light sensor is positioned to receive light generated by the light generator. The light sensor generates the signal in response to an interruption of the light received by the sensor. The device may further include device further an opaque shield directly or indirectly connected to the base. This shield is movable with respect to the light generator and sensor. More particularly, the shield is movable between first and second positions. When the shield is in the first position, the sensor receives light from the light generator. In contrast, the shield blocks the sensor from receiving light from the light generator when the shield is in the second position. When a data cartridge is inserted into the data storage system, the cartridge directly or indirectly engages and moves the shield from the first position to the second position.

18 Claims, 9 Drawing Sheets

DEVICE AND METHOD FOR DETECTING CARTRIDGE READINESS TO LOAD IN A DATA STORAGE SYSTEM

CROSS-REFERENCE TO RELATED APPLICATIONS

This application claims priority to application Ser. No. 60/265,830, filed Jan. 31, 2001, entitled Cartridge Loading Mechanism for Data Storage Disk. This application is related to application Ser. No. 09/854,333, filed May 11, 2001 entitled Optical Data Storage with Enhanced Contrast, application Ser. No. 09/946,845, filed Sep. 4, 2001, entitled Cartridge Load/Eject Mechanism for Data Storage Disk System, and application Ser. No. 60/265,830, filed Jan. 31, 2001, entitled Cartridge Loading Mechanism for Data Storage Disk. All of the above applications are incorporated herein in their entirety.

BACKGROUND OF THE INVENTION

Data storage systems (i.e., disk drives) are becoming an increasingly popular means for storing or retrieving data. In typical data storage systems, coded video signals, audio signals, or other information signals are typically recorded on a disk. For purposes of convenience and protection, a disk may be mounted within a cartridge.

The components of a typical data storage system include a housing with an opening through which the user inserts the cartridge. This housing accommodates, among other items, the mechanical and electrical subsystems for loading, reading from, writing to, and unloading the disk cartridge. These mechanical and electrical subsystems are typically controlled by the data processing system (e.g., a computer) to which the data storage system is connected.

To protect the disk when the cartridge is external from the data storage system, the disk cartridge may include a shutter that is normally closed. The cartridge shutter may have one or more locking tabs associated with it. The corresponding data storage system may include a mechanism for opening the shutter on the cartridge as the cartridge is pushed into the system. As the cartridge is inserted further into the data storage system, the mechanism opens the shutter to partially expose the disk contained therein. This permits a hub of the disk to be loaded onto a spindle of a motor mounted to a base of the data storage system. The disk, when rotated by the motor, permits a read-write head to access all portions of the disk.

To conserve space in data storage systems, it is desirable to minimize the size required by the device that loads a disk onto and unloads the disk from the spindle. Conventional loading and unloading devices vary depending upon the type of disk being used. A conventional disk loading and unloading system that uses disk cartridges is typically capable of automatically transporting a disk cartridge from a receiving port onto the spindle. When the disk is no longer needed, a conventional disk loading and unloading system automatically unloads the disk from the spindle. A device for loading and unloading of the disk is generally constructed so that during disk loading the disk is moved horizontally, parallel to the base, towards the spindle. When the disk has been positioned above the spindle, the disk is lowered vertically onto the spindle. A spindle magnet attracts the disk hub fixed to the center of the media, thereby clamping the disk in a rotatable condition for read-write operations.

SUMMARY OF THE INVENTION

Disclosed is a data storage system having a base, a motor mounted to the base, and a device for detecting the presence of a data cartridge in the data storage system. The device is operatively coupled to the motor and generates a signal when the device detects the presence of the data cartridge in the data storage system. The motor activates in response to generation of the signal. The motor, when activated, moves the data cartridge within the data storage system to an operational position where data may be read from or written to the data cartridge.

In one embodiment, the device includes a light sensor and a light generator. The light sensor is positioned to receive light generated by the light generator. The light sensor generates the signal in response to an interruption of the light received by the sensor. The device may further include an opaque shield directly or indirectly connected to the base. This shield is movable. More particularly, the shield is movable between first and second positions. When the shield is in the first position, the sensor receives light from the light generator. In contrast, the shield blocks or interrupts the light received by the sensor when the shield is in the second position. When a data cartridge is inserted into the data storage system, the cartridge may directly or indirectly engage and move the shield from the first position to the second position.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

FIG. 2b is a top view of the system shown in FIG. 2a;

FIGS. 6b and 6c are top views of the system shown in FIG. 6a;

While the invention is susceptible to various modifications and alternative forms, specific embodiments thereof are shown by way of example in the drawings and will herein be described in detail. It should be understood that the drawings and detailed description thereto are not intended to limit the invention to the particular form disclosed; on the contrary, the intention is to cover all modifications, equivalents, and alternatives falling within the spirit and scope of the present invention as defined by the appended claims.

DETAILED DESCRIPTION

Figure 1:
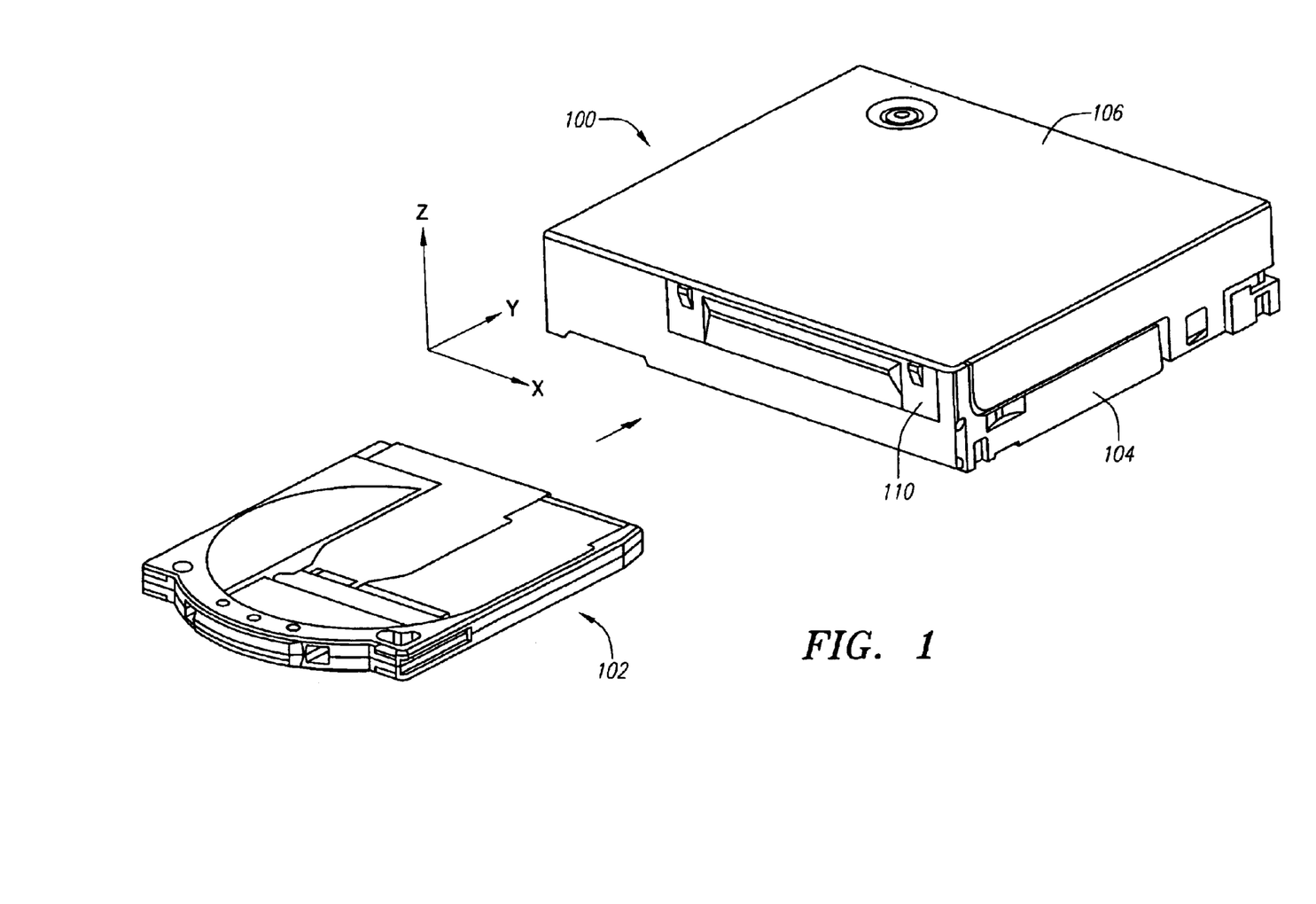
FIG. 1 is a perspective view of an exemplary data cartridge and an exemplary data storage system employing the present invention.

FIG. 1 is a perspective view of an exemplary data storage system 100 and an exemplary data cartridge 102. Data storage systems are often referred to as disk drives. This description will hereinafter refer to data storage system 100 as "system 100." System 100 is configured to receive and to read/write data to data cartridge 102. The figures of this detailed description use like reference numerals to designate like components.

System 100 includes a base 104 to which all other system 100 components are mounted, a cover 106, and a door 110. Door 110 is rotatable between open and closed positions to allow manual loading or unloading of a data cartridge 102 into or out of system 100. It is noted that two components may be directly mounted, coupled, connected or indirectly mounted, coupled, connected via one or more intermediate components.

System 100 may take form in various sizes. In one embodiment, the height of system 100 measured in the z direction may be as small as 10 mm, the width of system 100 measured in the x direction may be as small as 10 mm, and the length of system 100 measured in the y direction may be as small as 45 mm. Smaller sizes of system 100 are limited only by the ability to manufacture smaller components thereof.

Figure 2A:
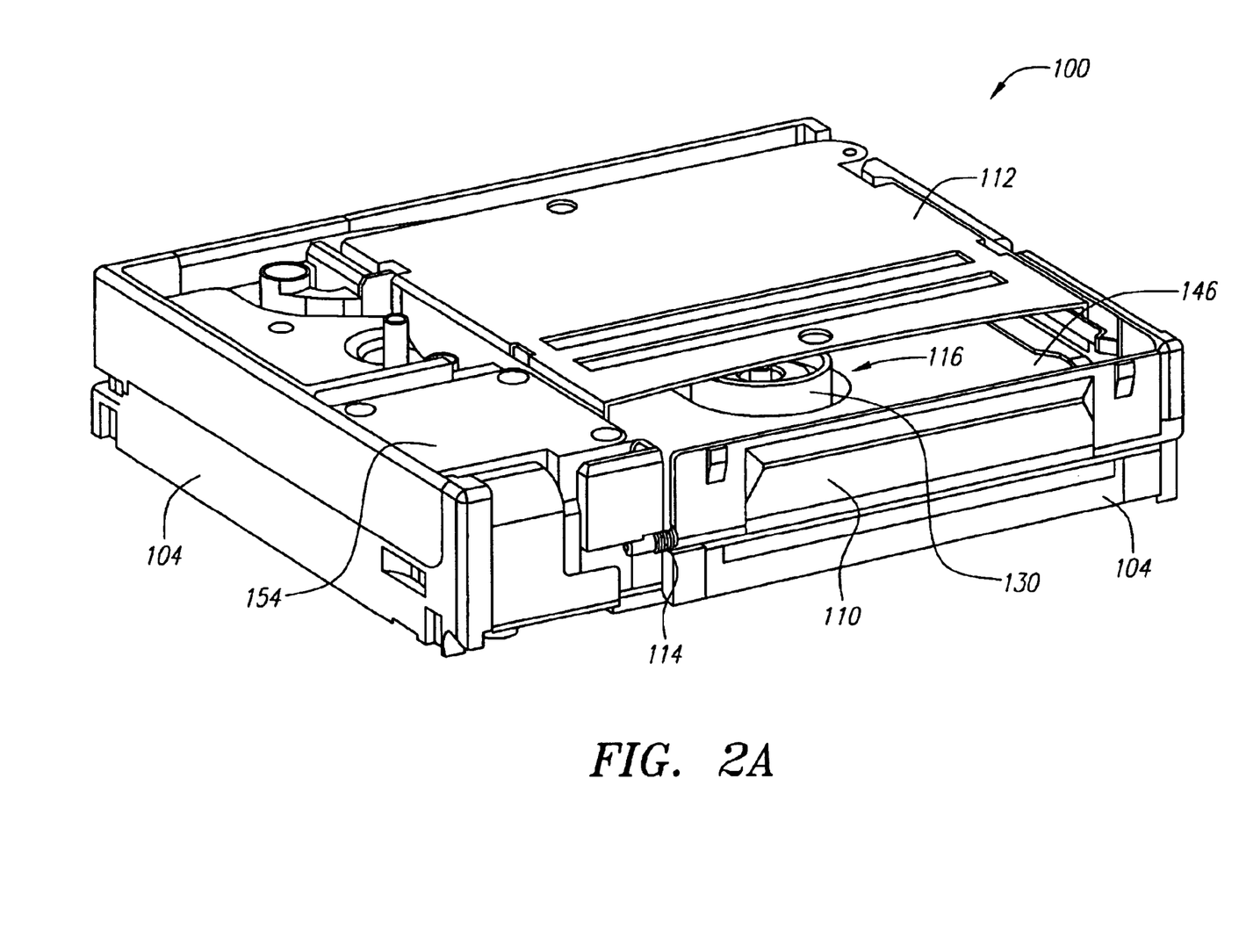
FIG. 2a is a perspective view of the system shown in FIG. 1 with its cover removed to expose several exemplary components.
Figure 2B:
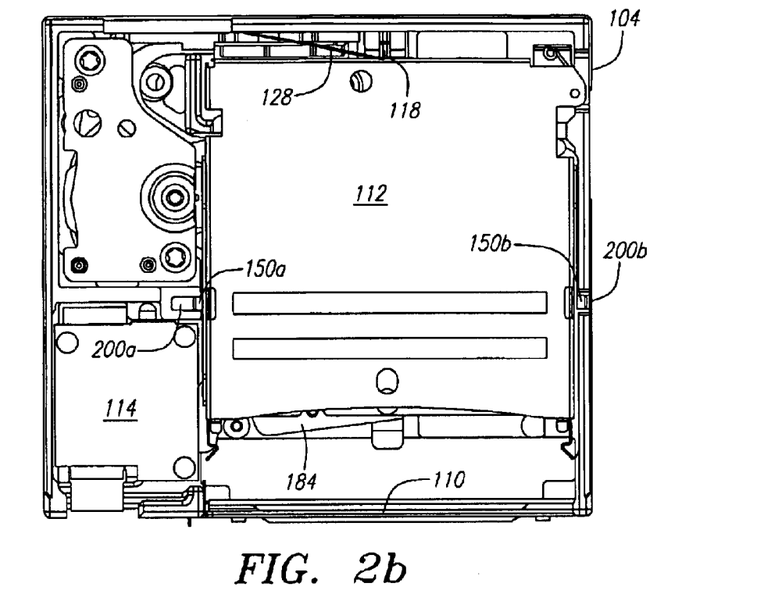
Figure 3:
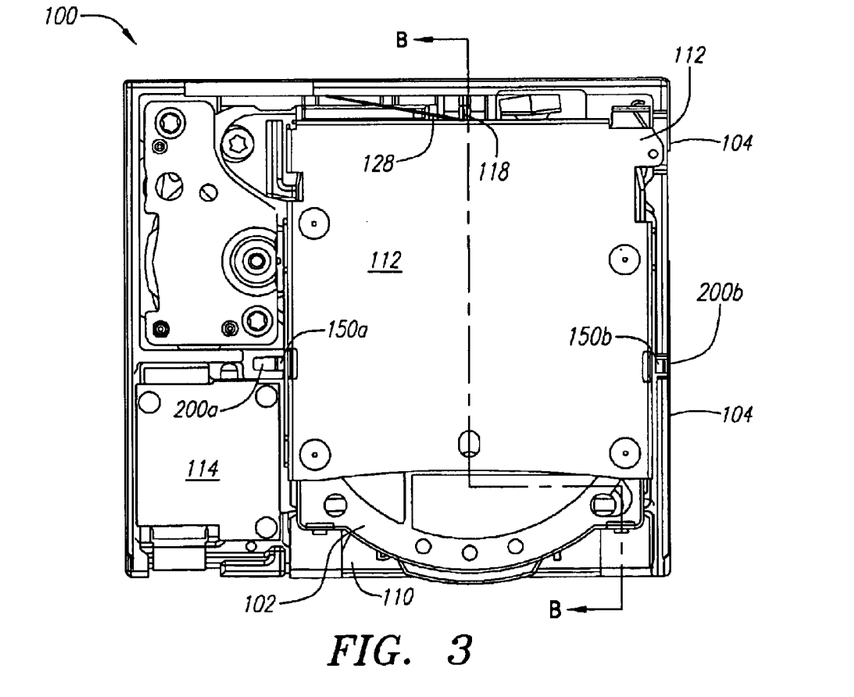
FIG. 3 is a top view of the system shown in FIG. 2b with a data cartridge received therein.

FIGS. 2a and 2b are perspective and top views, respectively, of the system 100 shown in FIG. 1 with cover 106 removed to expose several exemplary components. With continued reference to FIGS. 2a and 2b, exemplary internal components of system 100 include a tray 112 into which data cartridge 102 (not shown in FIGS. 2a and 2b) is received, a load motor 114, and a spindle motor 116 (partially shown in FIG. 2a, but not shown in FIG. 2b). FIG. 3 shows a top view of the system 100 of FIG. 2b with data cartridge 102 received in tray 112. Load motor 114 and tray 112 are two components of a mechanism for moving cartridge 102 onto spindle motor 116 after cartridge 102 is manually inserted in tray 112.

Figure 4:
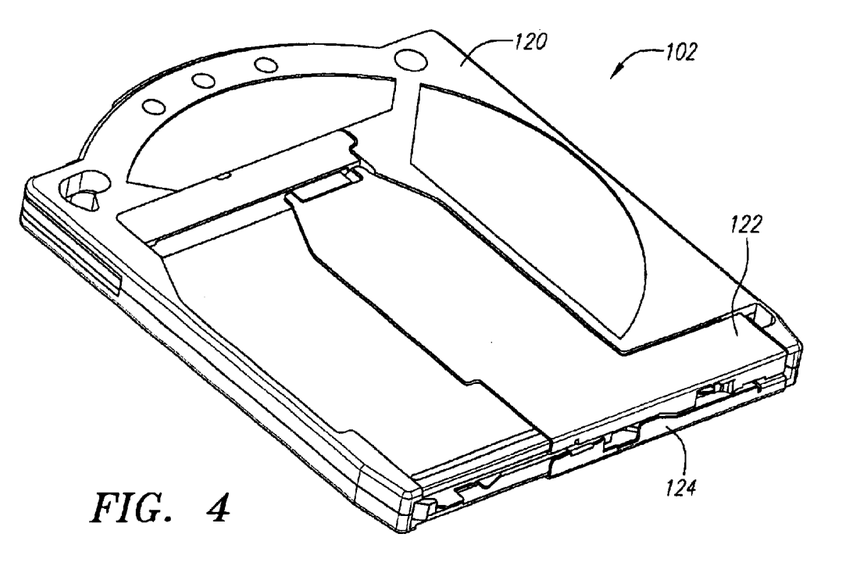
FIG. 4 is a perspective view of the cartridge shown in FIGS. 1 and 3.

FIG. 4 is a perspective view of data cartridge 102 shown in FIGS. 1 and 3. Data cartridge 102 includes a cartridge shell 120, a top sliding shutter 122, and a bottom-sliding shutter 124. The top and bottom sliding shutters 122 and 124 are capable of independently sliding between open and closed states. In FIG. 4, shutter 122 is shown closed.

Figure 5A:
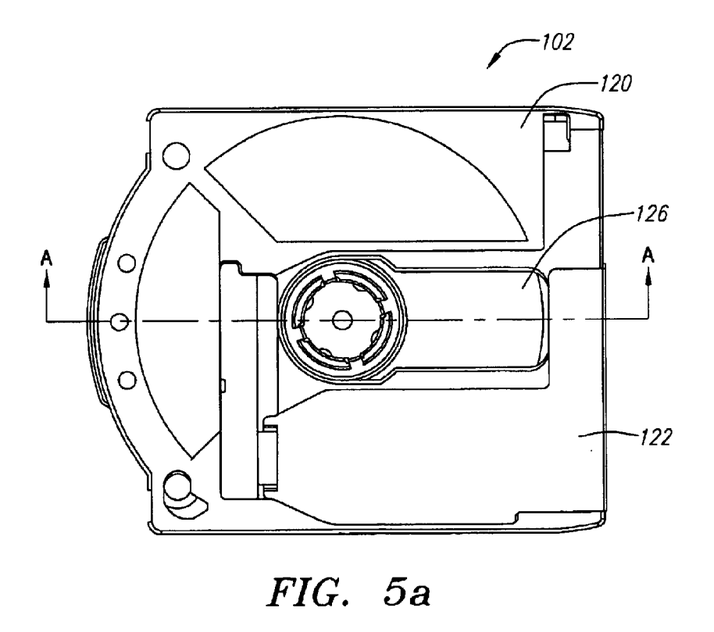
FIG. 5a is a top view of the cartridge shown in FIG. 4 with the shutter open.
Figure 5B:
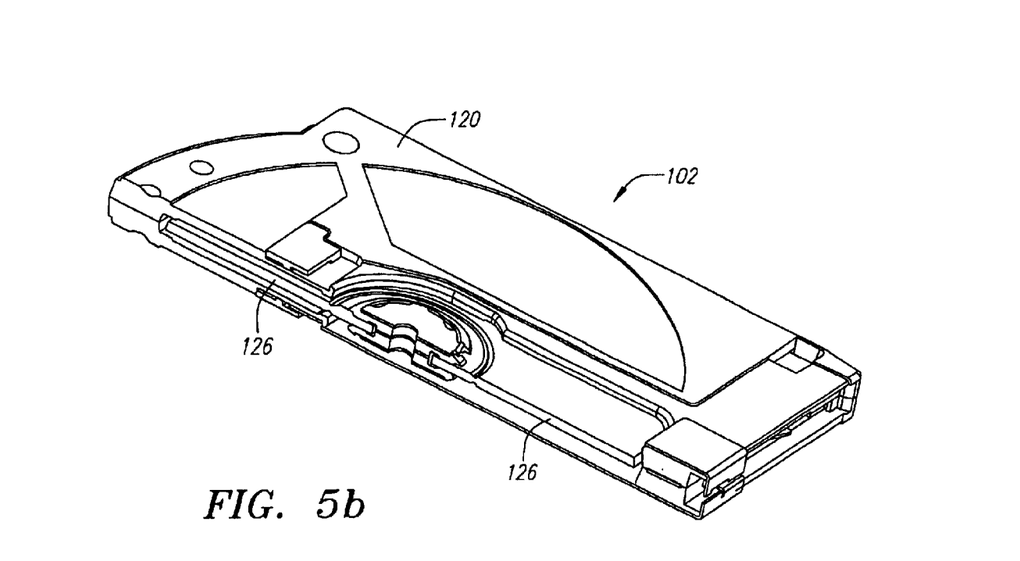
FIG. 5b is a cross-sectional view of the cartridge shown in FIG. 5a taken along line AA thereof.

FIG. 5a is a top view of data cartridge 102 shown in FIG. 4 with top sliding shutter 122 in the open state to expose data storage disk 126. With shutter 122 open, cylinder 130 of spindle motor 116 (FIG. 2) can engage and rotate data storage disk 126 while data is written thereto or read therefrom. FIG. 5b is a cross-sectional view of the data cartridge 102 shown in FIG. 5a taken along line AA thereof. As seen in FIG. 5b, data storage disk 126 can rotate freely within cartridge shell 120.

For purposes of explanation only, the present invention will be described with reference to a system 100 that optically reads/writes data to the data storage disk 126 in data cartridge 102, it being understood that the present invention may find application in other types of data storage/retrieval systems including those that magnetically or electro-magnetically read/write data to a disk in a cartridge. Data storage disk 126 in data cartridge 102 may take form in the optical data storage disk described in application Ser. No. 09/854,333 filed May 11, 2001, entitled Optical Data Storage With Enhanced Contrast.

Figure 6A:
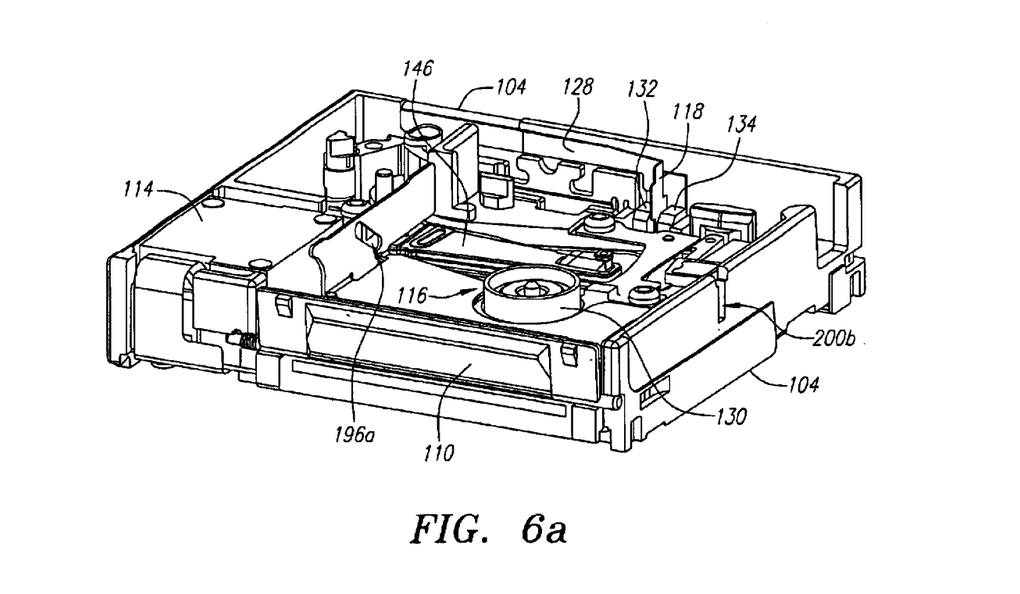
FIG. 6a is a perspective view of the system shown in FIG. 2a with several components removed to illustrate several underlying exemplary components.
Figure 6B:
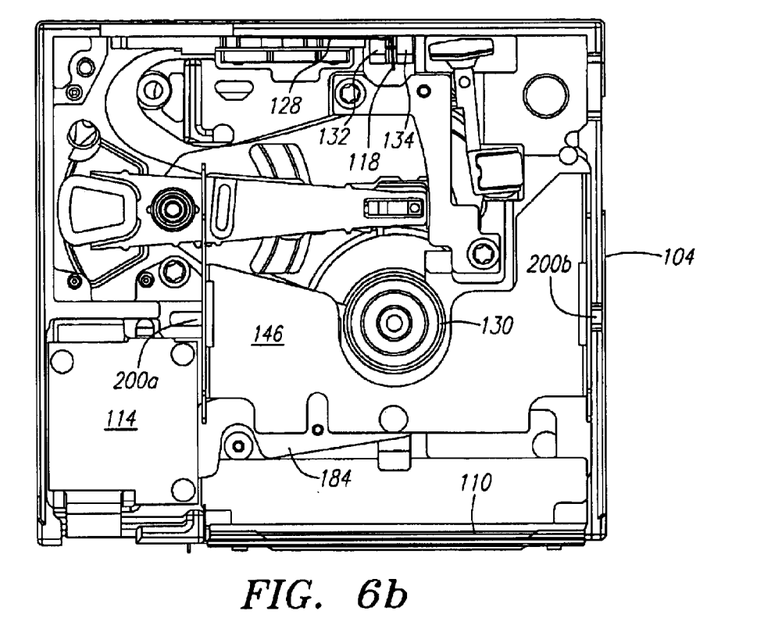
Figure 6C:
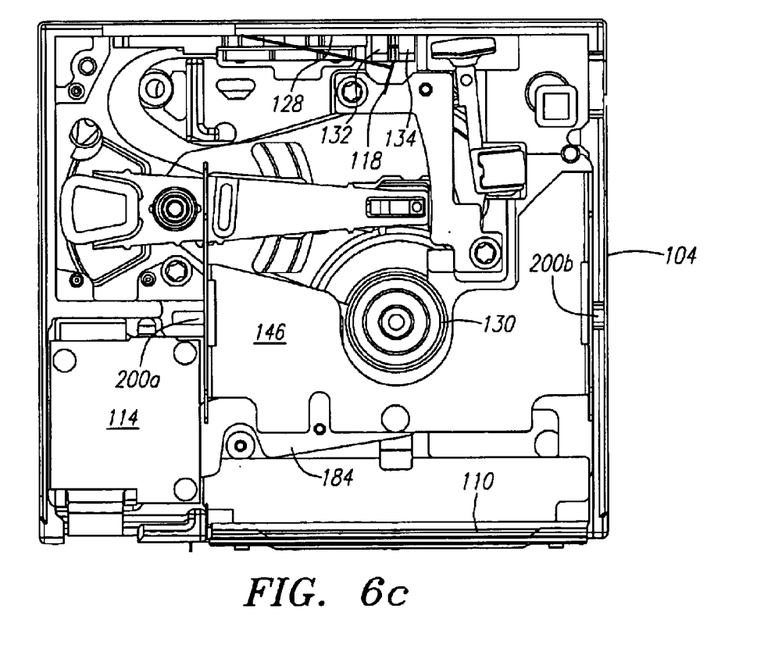

FIG. 6a is a perspective view of system 100 shown in FIG. 2a with tray 112 removed to expose several exemplary components. FIGS. 6b and 6c are top views of system 100 shown in FIG. 6a. In particular, FIGS. 6a–6c show a shield or flag 118 mounted to base 104 via flag spring 128. The combination of flag 118 and flag spring 128 need not be mounted to base 104 as shown in FIGS. 6a–6c. As shown in application Ser. No. 60/265,830, filed Jan. 31, 2001, entitled Cartridge Loading Mechanism for Data Storage Disk, the flag and flag spring may be mounted to the tray. The remaining description will presume that flag 118 and flag spring 128 are mounted to base 104 as shown in FIGS. 6a–6c.

Flag 118 may be formed from an opaque material. In a preferred embodiment, flag spring 128 is formed from a metal or other flexible material and includes first and second ends. The first end of flag spring 128 may be fixedly connected to base 104 using, for example, an adhesive or a weld. The second end of flag spring 128 is connected to flag 118. In one embodiment, flag 118 and flag spring 128 are formed from the same piece of flat metal such that flag 118 is integrally connected to flag spring 128. As will be more fully described below, flag 118 is movable between beam interruption and beam allowance positions. FIGS. 6a and 6b show flag 118 in the beam interruption position, and FIG. 6c shows flag 118 in the beam allowance position. Flag 118 is biased to the beam allowance position by flag spring 128.

FIGS. 6a–6b also show a light-generating device such as a light emitting diode (LED) 132 and a light sensor 134 mounted to base 104 via a printed circuit board (not shown). The combination of flag 118, LED 132 and a light sensor 134 represents one embodiment of a device for detecting the presence of data cartridge 102 in system 100. LED 132, when active, generates a light beam between LED 132 and light sensor 134. Light sensor 134, when active, generates a signal in response to receiving the light beam generated by LED 132 or in response to an interruption of the light beam generated by LED 132. The remaining description will presume that light sensor 134 generates a signal in response to an interruption of a light beam generated by LED 132.

Flag 118 is movable between the beam-interruption position and the beam allowance position. In the beam-interruption position, as shown in FIGS. 6a and 6b, flag 118 is positioned between LED 132 and light sensor 134 so that flag 118 interrupts the beam of light received by sensor 134. In other words, flag 118 shields sensor 134 from receiving light from LED 132 when flag 118 is in the beam-interruption position. In the beam allowance position, as shown in FIG. 6c, flag 118 is removed from between LED 132 and light sensor 134 so that light sensor 134 may receive the light beam generated by LED 132.

Flag 118 is normally in the beam allowance position. As will be more fully described below, flag 118 is moved from its beam allowance position to its beam-interruption position when data cartridge 102 is fully inserted into tray 112. In one embodiment, cartridge 102 directly or indirectly engages and moves flag 118 into its beam-interruption position when cartridge 102 is inserted into tray 112. The remaining description will presume that cartridge 102 indirectly engages and moves flag 118 into its beam-interruption position when cartridge 102 is inserted into tray 112. When cartridge 102 is removed from tray 112, flag spring 128 returns flag 118 to its beam allowance position shown in FIG. 6c.

Figure 7:
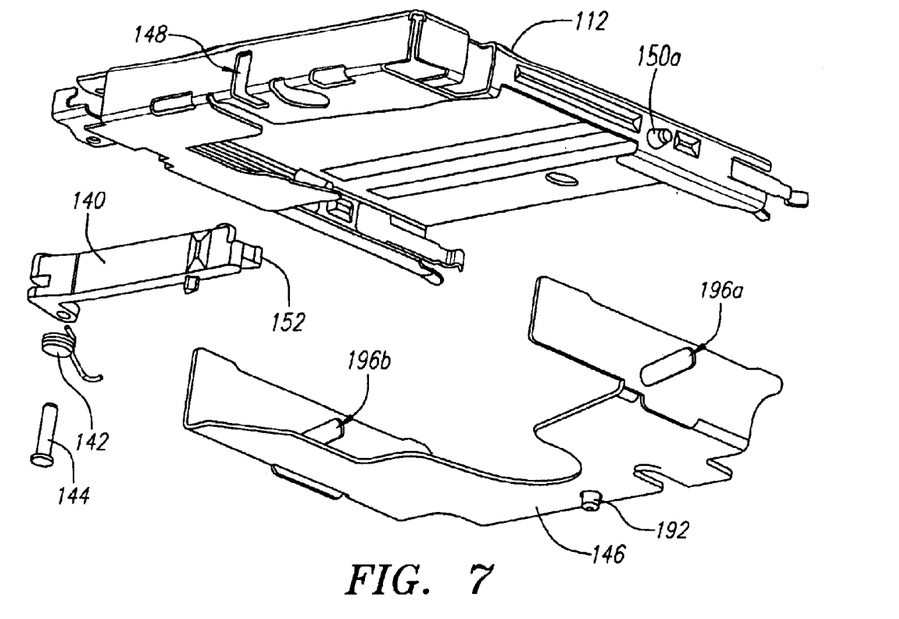
FIG. 7 is an exploded, perspective view of a mechanism for loading a cartridge into an operational position.

FIG. 7 is an exploded view of several components used in loading cartridge 102 into its operating position. FIG. 7 shows tray 112 along with a picker arm 140, a picker arm spring 142, a picker arm pin 144, and a cam plate 146. FIG. 7 shows these components isolated from base 104. Tray 112 is shown from below its normal position on base 104 (FIG. 2a). Tray 112 includes an aperture 148 through which a portion of flag 118 (FIGS. 6a–6c) extends when flag 118 is biased to its beam allowance position.

Figure 8:
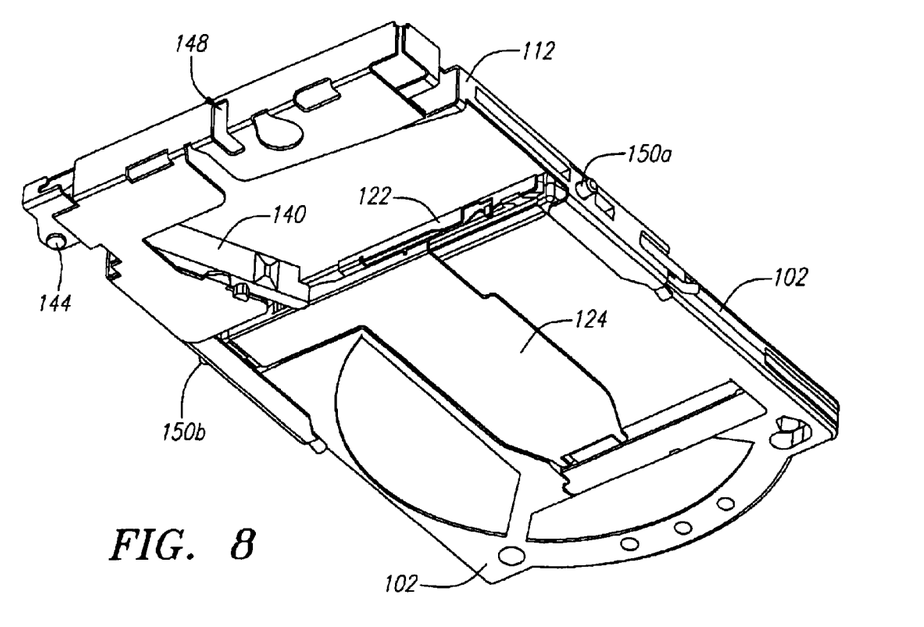
FIG. 8 is a perspective view of the mechanism shown in FIG. 7 while a cartridge is being inserted therein.

FIG. 8 shows picker arm 140 rotatably mounted within tray 112. FIG. 8 also shows data cartridge 102 being inserted into tray 112. Picker arm 140 rotates about picker arm pin 144 between cartridge-loaded and cartridge-unloaded positions. Picker arm spring 142 biases picker arm 140 to the cartridge-unloaded position. Along the side edges of tray 112 are cam pins 150a and 150b. As will be more fully described below, cam pins 150a and 150b interact with cam plate slots 196a and 196b of cam plate 146 (FIG. 7) and base slots 200a and 200b of base 104 (FIGS. 6a–6c) to move tray 112, and data cartridge 102 loaded therein, to its operating position where data can be read from or written to data storage disk 126 of the data cartridge 102.

Initially, picker arm 140 is in the cartridge-unloaded position and flag 118 is in the beam allowance position. With continued reference to FIGS. 7 and 8, a hook 152 at the end of picker arm 140 engages bottom sliding shutter 124 of data cartridge 102 when data cartridge 102 is first inserted in tray 112. As data cartridge 102 is further inserted, picker arm 140 rotates about picker arm pin 144 to slide shutter 124 to its open position thereby exposing data storage disk 126. Eventually picker arm 140 rotates about picker arm pin 144 and engages flag 118 (FIGS. 6a–6c) extending through aperture 148. While picker arm 144 moves to its cartridge-loaded position, picker arm 144 pushes flag 118 to its beam-interruption position between sensor 234 and LED 132 (FIGS. 6a and 6b).

Figure 9:
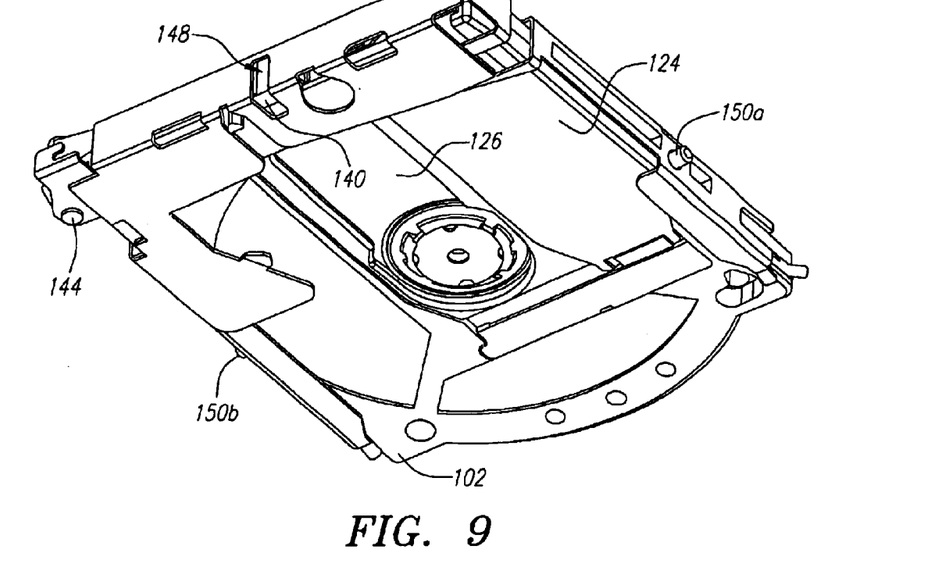
FIG. 9 is a perspective view of the mechanism shown in FIG. 7 with a cartridge fully inserted therein.

FIG. 9 shows data cartridge 102 fully loaded into tray 112. When data cartridge 102 has been fully loaded, picker arm 140 is in the cartridge-loaded position, and flag 118 has been pushed backward to its beam-interruption position (FIGS. 6a and 6c). In this position, flag 118 interrupts the beam of light between LED 132 and light sensor 134. In response, light sensor 134 generates a beam interruption signal. The beam interruption signal is provided to drive electronics (not shown) on the printed circuit board. The beam interruption signal informs drive electronics that data cartridge 102 is fully loaded in tray 112 and ready to be moved into the operational position.

Figure 10:
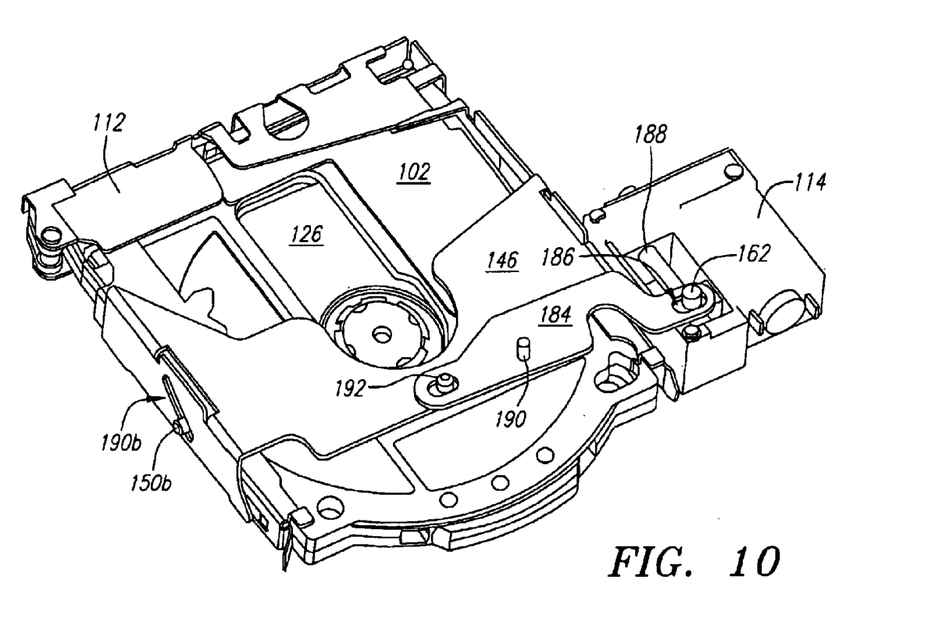
FIG. 10 is a perspective view of a load motor for loading a cartridge into the operational position.

In response to the beam interruption signal, the drive electronics generates a load-cartridge signal that activates load motor 114 shown in FIG. 10. FIG. 10 also shows load motor 114 coupled to cam plate 146 via lever arm 184. Load motor 114 can be a miniature permanent magnet DC motor manufactured by Copal of Japan (model LA8-388). The components of FIG. 10 are shown from below there normal position.

With continued reference to FIG. 10, a drive pin 162 of motor 114 engages lever arm 184 by means of a cutout 186 in lever arm 184. Welded to lever arm 184 is a pivot pin 190 that fits into a hole in base 104 (not shown in FIG. 10). When load motor 114 is activated, load motor 114 moves drive pin 162 linearly along a lead screw 188 via a linkage more fully described in application Ser. No. 60/265,830, filed Jan. 31, 2001, and entitled Cartridge Loading Mechanism for Data Storage Disk. As drive pin 162 moves linearly, lever arm 184 rotates about pivot pin 190.

A pin 192 is connected to cam plate 146 (FIG. 7) and extends through an opening of lever arm 184 at the end opposite cutout 186. Cam plate 146 fits around tray 112, with the cam pins 150a and 150b of tray 112 inserted into angled cam slots 190a and 190b, respectively, of cam plate 146. As shown in FIG. 2b, pins 150a and 150b also fit into base slots 200a and 200b, respectively, of base 104.

When drive pin 162 moves linearly by action of load motor 114, lever arm 184 rotates, forcing cam plate 146 from its forward to its rear position. This action in turn causes cam plate slots 196a and 196b to slide against cam pins 150a and 150b, which are retained in slots 200a and 200b of base 104. Because cam plate slots 196a and 196b are angled, this has the effect of lowering tray 112. When tray 112 is lowered, data cartridge 102 is moved into the operating position.

Figure 11:
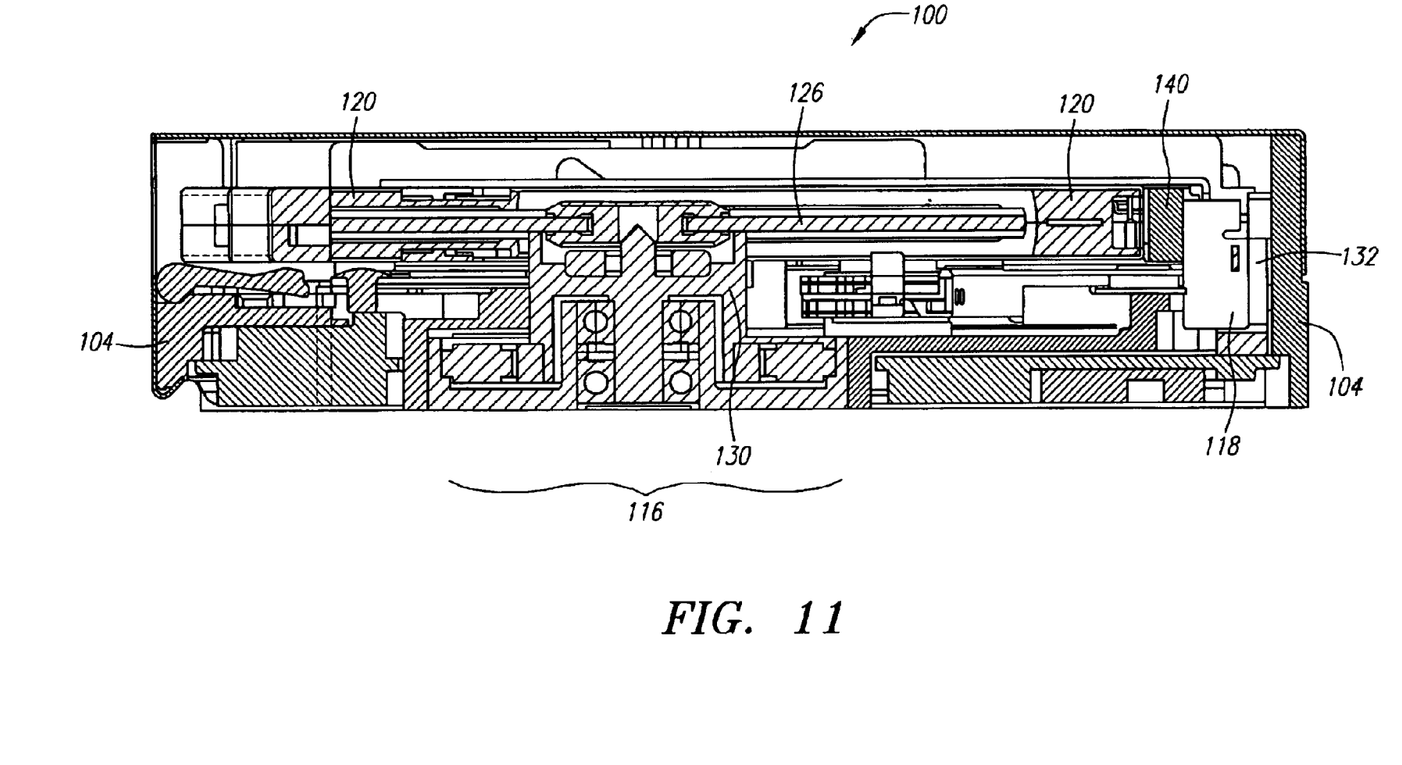
FIG. 11 is a cross sectional view of the system shown in FIG. 3 taken along line BB thereof.

FIG. 11 is a cross-sectional view taken along line BB of FIG. 3. FIG. 11 shows data cartridge 102 in the operating position. As explained above, flag 118 is moved into the beam interruption position when cartridge 102 is fully inserted into tray 112. Only after cartridge 102 is fully inserted into tray 112 will cartridge 102 be moved into the operating position. Through the system electronics (not shown), a timing delay may be imposed on the initiation of the load process after flag 118 has been moved into the beam-interruption position. This delay can be used to assure that flag 118 is stationary and that the beam has been interrupted continuously for a specified amount of time. In this manner, load process reliability may be improved. In the operating position as shown in FIG. 11, disk 126 of cartridge 102 engages cylinder 130 of spindle motor 116. FIG. 11 also shows flag 118 in its beam-interruption position. Flag 118 should remain in its beam-interruption position as cartridge 102 is moved into its operating position.

Once data cartridge 102 is fully lowered into its operating position, load motor 114 stalls and is then turned off. When the user of a host system (e.g., a consumer product like a digital camera, an e-book, etc.) in which the system 100 is installed issues an eject command through an electronic interface to system 100, a status check is performed by the system 100 electronics to determine whether all write operations are complete. If a write operation is still in process, the electronics of system 100 issue a busy status indication back to the electronics of the host system through the electronic interface. Once the write operation is complete, the spindle motor is stopped and only then is the load/eject motor 114 powered in a polarity opposite from that used in the load sequence by the drive electronics (not shown). In response, load motor 114 is again activated to move pin 162 from the forward to the rear position. By means of lever arm 184, this causes cam plate 146 to move from its rear to its forward position, and by the reverse of the operation described above, tray 112 is lifted thereby removing cartridge 102 from its operating position. When tray 112 has moved upward a certain distance, picker arm 140 swings forward, partially ejecting data cartridge 102 from system 100.

Cartridge 102 may inadvertently move from its fully loaded position in tray 112 after generation of the load cartridge signal. If data cartridge 102 is not fully loaded in tray 112 while motor 114 lowers tray 112 to its operational position, damage may result to motor 114, tray 112, data cartridge 102, or other components of system 100. To avoid this, in one embodiment load motor 114 operates to lower tray 112 only if data cartridge 102 is fully loaded in tray 112 so that flag 118 interrupts the light beam between LED 132 and light sensor 134. If data cartridge 102 moves from its fully loaded position in tray 112 after motor 114 is activated by system electronics, flag 118 moves from its beam interruption position, thereby reestablishing the light beam between LED 132 and light sensor 134. When the light beam is reestablished in this situation, drive electronics suspend or reverse operation of load motor 114 to avoid damaging motor 114, tray 112, data cartridge 102, or other components of system 100.

Although the present invention has been described in connection with several embodiments, the invention is not intended to be limited to the specific forms set forth herein. On the contrary, it is intended to cover such alternatives, modifications, and equivalents as can be reasonably included with in the spirit and scope of the invention as defined by the appended claims.

What is claimed is:

1. A data storage system for reading or writing data to a data storage disk, the data storage system comprising:
    a light sensor;
    a light generator positioned adjacent the light sensor configured to generate light; and
    a device including a shield coupled to a first end of a flat spring, a second end of the flat spring coupled to a base of the data storage system, said device movable between a first position where said light sensor is configured to receive light generated from said light generator and a second position, where said shield interrupts said light sensor from receiving said light generated by the light generator.

2. The data storage system of claim 1, further comprising a motor mounted to a base, wherein the light sensor is configured to generate a first signal when the device shields the light sensor from receiving light generated by the light generator, and wherein the motor activates in response to the light sensor generating the first signal.

3. The data storage system of claim 2, wherein the motor activates after a predetermined delay after the light sensor initially generates the first signal.

4. The data storage system of claim 3, wherein the predetermined delay corresponds to data stored in a memory circuit.

5. The data storage system of claim 2, wherein the data storage system is configured to receive a data cartridge containing the data storage disk, and wherein the data cartridge, when received by the data storage system, moves from a first position in the data storage system to a second position in the data storage system when the motor activates in response to the light sensor generating the first signal.

6. The data storage system of claim 5, wherein the data cartridge directly or indirectly engages and moves the device when the data cartridge is received in the data storage system.

7. A data storage system for reading or writing data to a data storage disk, the data storage system comprising:
    a light sensor;
    a light generator positioned adjacent the light sensor, wherein the light generator is configured to generate light;
    a device movable between first and second positions;
    wherein light sensor receives light generated by the light generator when the device is in its first position;
    wherein the device shields the light sensor from receiving light generated by the light generator when the device is in the second position, and
    a motor mounted to a base, wherein the light sensor is configured to generate a first signal when the device shields the light sensor from receiving light generated by the light generator, and wherein the motor activates in response to the light sensor generating the first signal,
    the device comprises a flag, wherein the flag is connected to a flat spring, wherein the flat spring extends between first and second ends, wherein the flag is connected to the first end of the spring, wherein the second end of the spring is connected to the base, and wherein the flag shields the sensor from receiving light generated by the light generator when the device is in its second position.

8. A data storage system for reading or writing data to a data cartridge, the data storage system comprising:
    a base;
    a motor mounted to the base;
    a device including a light sensor, a light generator, and a shield, said light sensor configured to receive light generated by the light generator, said light sensor configured to generate a signal in response to an interruption of the light being received by the light sensor by said shield for detecting the presence of the data cartridge in the data storage system, said shield coupled to a flat spring at a first end of the flat spring, said flat spring coupled to said base.

9. The data storage system of claim 8, wherein the motor activates after a predetermined delay in time after the device generates the signal.

10. The data storage system of claim 9, further comprising a memory circuit coupled to the device and the motor, wherein the predetermined delay corresponds to data stored in the memory circuit.

11. The data storage system of claim 8, wherein a data cartridge directly or indirectly engages and moves the shield when the data cartridge is inserted into the data storage system.

12. The data storage system of claim 8, wherein the motor activates in response to the light sensor generating the signal.

13. The data storage system of claim 8, further comprising a second device for optically reading or writing data to an optical data storage disk.

14. A method comprising:

generating a light beam, with a light generator contained within a data storage system;

receiving the light beam generated by the light generator with a light sensor contained within the data storage system and positioned adjacent the light generator; and interrupting the light beam received by the light sensor including moving a shield coupled to a flat spring at a first end of the flat spring, said flat spring coupled to a wall of the data storage system.

15. The method of claim 14, further comprising:

activating a motor in response to interrupting the light beam received by the light sensor;

moving a data cartridge within the data storage system in response to activating the motor.

16. The method of claim 15, wherein the motor is activated after a predetermined delay after the light beam is interrupted.

17. The method of claim 14, further comprising the light sensor generating a signal in response to interruption of the light beam.

18. The method of claim 14, wherein interrupting the light beam further comprises directly or indirectly engaging the shield with a portion of a data cartridge to cause the shield to move between the light sensor and the light generator.

* * * * *